United States Patent
Tsai

(10) Patent No.: US 9,753,588 B2
(45) Date of Patent: Sep. 5, 2017

(54) DISPLAY APPARATUS AND TOUCH SENSING METHOD THEREOF

(75) Inventor: Hsiung-Kuang Tsai, Taipei (TW)

(73) Assignee: SLIM HMI TECHNOLOGY, Taipei (TW)

( * ) Notice: Subject to any disclaimer, the term of this patent is extended or adjusted under 35 U.S.C. 154(b) by 99 days.

(21) Appl. No.: 14/381,176

(22) PCT Filed: Feb. 27, 2012

(86) PCT No.: PCT/CN2012/071656
§ 371 (c)(1),
(2), (4) Date: Jan. 21, 2015

(87) PCT Pub. No.: WO2013/127051
PCT Pub. Date: Sep. 6, 2013

(65) Prior Publication Data
US 2015/0130747 A1     May 14, 2015

(51) Int. Cl.
*G06F 3/044* (2006.01)
*G06F 3/041* (2006.01)
(Continued)

(52) U.S. Cl.
CPC ............ *G06F 3/044* (2013.01); *G06F 3/0412* (2013.01); *G06F 3/0416* (2013.01); *G09G 3/20* (2013.01);
(Continued)

(58) Field of Classification Search
CPC ...... G06F 3/0416; G06F 3/0418; G06F 3/044; G06F 3/0412; G06F 3/0488;
(Continued)

(56) References Cited

U.S. PATENT DOCUMENTS

| 7,084,860 B1 * | 8/2006 | Jaeger ................... G06F 3/0416 |
| | | 178/18.01 |
| 8,659,559 B2 * | 2/2014 | Wu ....................... G06F 3/0412 |
| | | 178/18.06 |

(Continued)

FOREIGN PATENT DOCUMENTS

| CN | 1716018 A | 1/2006 |
| CN | 101122838 A * | 2/2008 |

(Continued)

*Primary Examiner* — Sanjiv D Patel
(74) *Attorney, Agent, or Firm* — Muncy, Geissler, Olds & Lowe, P.C.

(57) ABSTRACT

A touch sensing method of a display apparatus is disclosed. The display apparatus includes an active matrix substrate including a plurality of column electrodes and a plurality of row electrodes crossing the column electrodes. Each of the column electrodes is electrically connected to a driving module or a sensing module. The touch sensing method comprises steps of: transmitting a scan driving signal to at least a row electrode; transmitting a touch driving signal to the column electrode electrically connected to the driving module; capacitively coupling the touch driving signal through at least an external object, and receiving a coupling signal by the column electrode electrically connected to the sensing module; and detecting the position of the external object according to the coupling signal. Therefore, the invention can be directly applied to the active matrix substrate and enhance the accuracy of the touch sensing.

18 Claims, 8 Drawing Sheets

(51) Int. Cl.
  *G09G 5/00* (2006.01)
  *G09G 3/20* (2006.01)
  *G09G 3/36* (2006.01)

(52) U.S. Cl.
  CPC ........... *G09G 5/003* (2013.01); *G09G 3/3611* (2013.01); *G09G 3/3648* (2013.01); *G09G 2300/08* (2013.01); *G09G 2310/08* (2013.01)

(58) Field of Classification Search
  CPC ................................ G06F 2203/04104; G09G 2310/0264–2310/0297
  See application file for complete search history.

(56) References Cited

U.S. PATENT DOCUMENTS

| | | | | |
|---|---|---|---|---|
| 9,086,774 | B2* | 7/2015 | Hotelling | G06F 3/0412 |
| 2006/0262100 | A1* | 11/2006 | Van Berkel | G06F 3/0412 |
| | | | | 345/173 |
| 2008/0158182 | A1* | 7/2008 | Westerman | G06F 3/044 |
| | | | | 345/173 |
| 2009/0058831 | A1* | 3/2009 | Chen | G06F 3/044 |
| | | | | 345/174 |
| 2010/0321337 | A1* | 12/2010 | Liao | G06F 3/0416 |
| | | | | 345/174 |
| 2011/0007019 | A1* | 1/2011 | Tasher | G06F 3/0416 |
| | | | | 345/174 |
| 2011/0025638 | A1* | 2/2011 | Salaverry | G06F 3/044 |
| | | | | 345/174 |
| 2011/0042153 | A1* | 2/2011 | Wu | G06F 3/0416 |
| | | | | 178/18.06 |
| 2011/0109568 | A1* | 5/2011 | Wu | G06F 3/0412 |
| | | | | 345/173 |
| 2011/0254795 | A1* | 10/2011 | Chen | G06F 3/0412 |
| | | | | 345/173 |
| 2012/0113038 | A1* | 5/2012 | Chen | G06F 3/0412 |
| | | | | 345/173 |
| 2013/0021296 | A1* | 1/2013 | Min | G06F 3/044 |
| | | | | 345/174 |

FOREIGN PATENT DOCUMENTS

| | | |
|---|---|---|
| CN | 101131618 A | 2/2008 |
| CN | 101943977 A | 1/2011 |
| JP | 2009116224 A | 5/2009 |
| TW | 201019194 A | 5/2010 |
| TW | 201120507 A1 | 6/2011 |

\* cited by examiner

DISPLAY APPARATUS AND TOUCH SENSING METHOD THEREOF

BACKGROUND OF THE INVENTION

Field of Invention

The invention relates to a display apparatus and a touch sensing method.

Related Art

Recently, the touch panel has been widely applied to general consumer electronics, such as mobile communication devices, digital cameras, MP3, PDA, GPS, hand-held PC, and even brand-new ultra mobile PC (UMPC). The said touch panel is combined with a display screen to form a touch display device.

In the conventional touch sensing method, first the sensing is implemented along the X-direction and Y-direction, then the touch position along the respective directions can be computed from the magnitude of the signal, and the actual touch coordinates can be obtained by the intersection of the extended lines of the two touch positions along the X-direction and Y-direction. When this method is applied to the situation of limited number of touch sensing lines, the accurate touch coordinates can still be obtained by accurately measuring the magnitude of the signal. However, the accurate measurement also limits the sensing speed.

A known manufacturing method of a touch display apparatus is to directly disposing a touch panel on the display panel of a display module. However, this not only increases the weight and size of the product, but also increases the cost of the touch display apparatus due to the additional touch panel.

Therefore, it is an important subject to provide a display apparatus and a touch sensing method where the touch function can be achieved without additional touch panel so as to make the product lighter and thinner and reduce the cost. Although a couple of solutions have been proposed by adding some sensing elements such as capacitors, resistors or optical devices to the display apparatus, the optical sensing element will influence the display quality for occupying a part of the pixel area and a complicated algorithm is also required to eliminate the interference from the environmental light. Besides, the reliability and durability of the said added elements also need time to verify and the manufacturing process complexity will also be increased.

The major difference between changing the touch sensing matrix from a conventional touch sensor array to a display matrix of a display panel is in the 100~1000 times reduction in pixel size, for example, from 5 mm×5 mm to 100 μm×300 μm. Therefore, if same detection scheme (detecting the capacitance change caused by the grounding of surface by user body) is used, the base capacitance will become relatively large and thus reduce the signal magnitude. Besides, merging the touch sensing signal with the display driving signal will reduce the time available for sensing and further increase the difficulty of detection. The signal-to-noise ratio can't be improved by connecting multiple electrodes in parallel since connecting multiple electrodes in parallel not only increase the sensing area but also increase the base capacitance. Therefore, the ratio of the sensing capacitance to the basic capacitance can't be changed. This ratio is determined by the display matrix itself.

SUMMARY OF THE INVENTION

An objective of the invention is to provide a display apparatus and a touch sensing method thereof which can be directly applied to the active matrix substrate so that the touch sensing accuracy can be enhanced.

The invention can be accomplished by adopting the following technical schemes.

A touch sensing method of a display apparatus is disclosed. The display apparatus includes an active matrix substrate including a plurality of column electrodes and a plurality of row electrodes crossing the column electrodes. Each of the column electrodes is electrically connected to a driving module or a sensing module. The touch sensing method comprises steps of: transmitting a scan driving signal to at least a row electrode; transmitting a touch driving signal to the column electrode electrically connected to the driving module; capacitively coupling the touch driving signal through at least an external object, and receiving a coupling signal by the column electrode electrically connected to the sensing module; and detecting the position of the external object according to the coupling signal.

A display apparatus having a touch sensing function comprises an active matrix substrate including a plurality of column electrodes and a plurality of row electrodes crossing the column electrodes. During the touch sensing, each of the column electrodes is electrically connected to a driving module or a sensing module to act as a driving column electrode or a sensing column electrode. At least one of the column electrodes is the driving column electrode at a first time and is the sensing column electrode at a second time.

As mentioned above, in the display apparatus and the touch sensing method of the invention, the scan driving signal is transmitted to the row electrode, the touch driving signal is transmitted to the driving column electrode that is in the driving mode (electrically connected to the driving module), and the coupling signal is received by the sensing column electrode that is in the sensing mode (electrically connected to the sensing module) and transmitted to the sensing module. Hence, the touch coordinates can be obtained according to the coupling signal. Thus, the display apparatus and the touch sensing method thereof of the invention can be directly applied to an active matrix substrate with row electrodes and column electrodes, for example the scan lines and data lines of a display panel, so that the product can be lightened and thinned, the cost can be reduced and the product competitiveness can be enhanced. Furthermore, in the display apparatus and the touch sensing method thereof of the invention, the touch position is obtained by detecting the existence of the coupling signal or the encoded information instead of detecting the changed electrode capacitance, so the accuracy of the touch sensing can be considerably enhanced.

There are at least two differences between this invention and the conventional touch detection method. First, the touch position is obtained not by detecting the touch signals along two axes, but the detection is just implemented along a single axis and the scan signal is used to determine the detection region in the other axis. Thus the results of these one-dimension detections can be assembled into a two-dimension sensing data for determining the touch position. Secondly, this invention does not detect the variation of the capacitance caused by the human body (or other objects capable of causing capacitive coupling) touching the surface, but the signal of the driving column electrode coupled to the sensing column electrode by human body. Therefore, the human body is to transmit the signal instead of grounding the signal.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
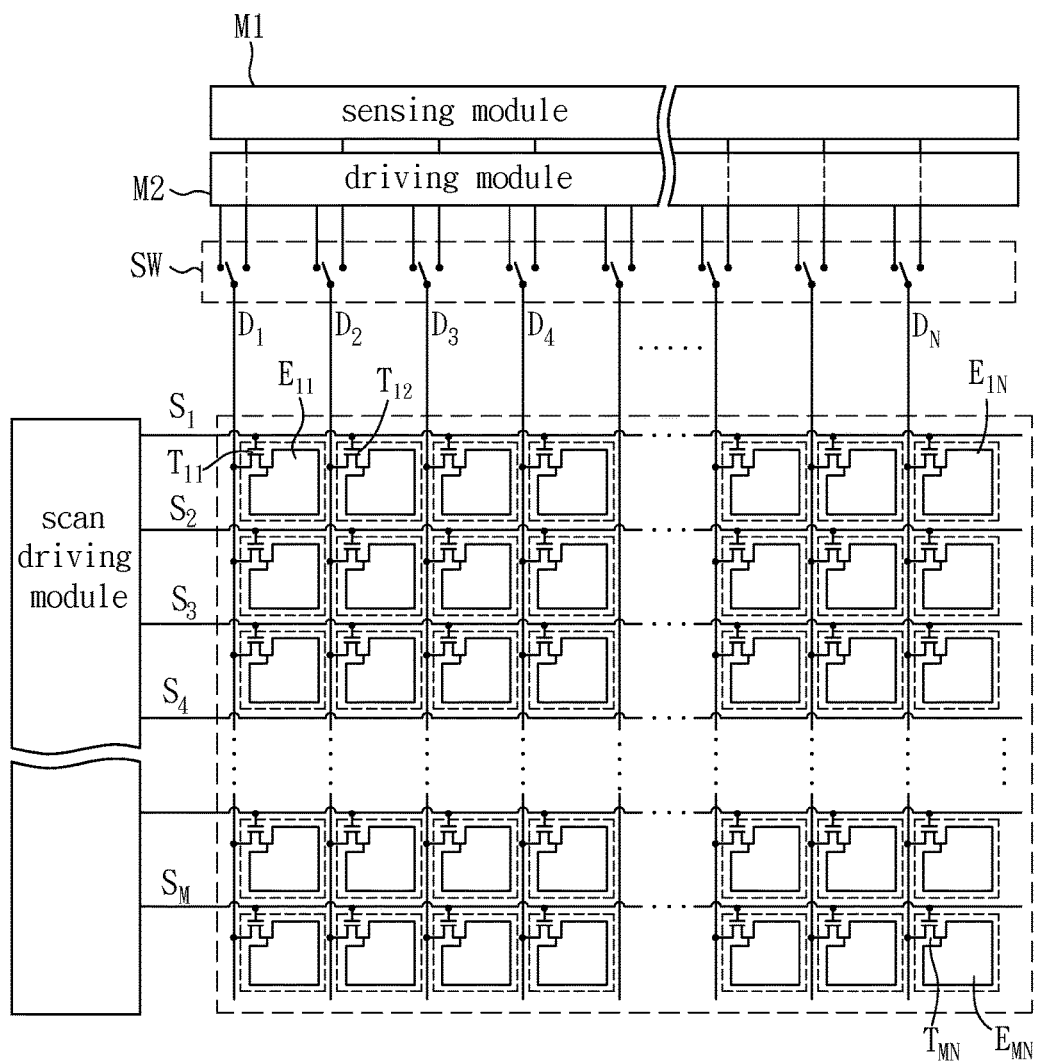
FIG. 1 is a schematic diagram of an active matrix substrate applied to the touch sensing method according to an embodiment of the invention.

A display apparatus and a touch sensing method according to an embodiment of the invention is applied to a display apparatus and, more specifically, mainly applied to an active matrix substrate of the display apparatus. FIG. 1 is a schematic diagram of an active matrix substrate.

As shown in FIG. 1, the touch sensing method according to an embodiment of the invention works with the active matrix substrate of the display apparatus. The active matrix substrate of the display apparatus includes a plurality of row electrodes $S_1 \sim S_M$ and a plurality of column electrodes $D_1 \sim D_N$. The row electrodes $S_1 \sim S_M$ and the column electrodes $D_1 \sim D_N$ are arranged to cross each other, for example, in right angle. The active matrix substrate further includes a plurality pixel electrodes $E_{11} \sim E_{MN}$ and a plurality of switches $T_{11} \sim T_{MN}$. The switches $T_{11} \sim T_{MN}$, formed an array, are disposed at the intersections of the row electrodes $S_1 \sim S_M$ and the column electrodes $D_1 \sim D_N$ and are electrically connected to the row electrodes $S_1 \sim S_M$, the column electrodes $D_1 \sim D_N$ and the pixel electrodes $E_{11} \sim E_{MN}$. The switch $T_{11}$ represents the switch that electrically connects to the row electrode $S_1$ and the column electrode $D_1$. The pixel electrode $E_{11}$ represents the one that electrically connects to the switch $T_{11}$, and is disposed within the region bounded by the row electrodes $S_1$, $S_2$ and the column electrodes $D_1$, $D_2$. The switch $T_{MN}$ represents the one that electrically connects to the row electrode $S_M$ and the column electrode $D_N$. The pixel electrode $E_{MN}$ represents the one that electrically connected to the switch $T_{MN}$. The other switches and pixel electrodes can be deduced by analogy. Of course, the above structure is just for the illustration, and the region bounded by the column electrodes and the row electrodes may have multiple switches or pixel electrodes in other embodiments.

Herein, the active matrix substrate is a thin film transistor (TFT) substrate as an example, wherein the row electrodes are scan lines, the column electrodes are data lines and the switches are TFT elements.

Each of the column electrodes $D_1 \sim D_N$ is electrically connected to a sensing module M1 or a driving module M2, and that is to say, the column electrodes $D_1 \sim D_N$ are electrically connected to the sensing module M1 or the driving module M2 through the switching switches SW. Therefore, the touch sensing method of this embodiment further includes a step of switching at least one of the column electrodes to act as the driving column electrode or the sensing column electrode. Thus, a certain column electrode can be a driving column electrode at a first time and be a sensing column electrode at a second time. Of course, the structure in FIG. 1 is just for the illustration, and the structure may be varied in other embodiments. For example, the sensing module M1, the driving module M2 and the switching switches SW can be integrated to the same circuit and even integrated into the original data driving circuit.

When the touch sensing is implemented, the column electrodes $D_1 \sim D_N$ have at least a driving column electrode and at least a sensing column electrode through the switching of the switching switches SW. Herein, the driving column electrode is defined as below: when a column electrode is electrically connected to the driving module M2, the column electrode is a driving column electrode. The sensing column electrode is defined as below: when a column electrode is electrically connected to the sensing module M1, the column electrode is a sensing column electrode. In this embodiment, multiple driving column electrodes or multiple sensing column electrodes can exist at the same time. For example, in a certain frame time during the sensing period, the column electrodes $D_1 \sim D_N$ can have multiple driving column electrodes and multiple sensing column electrodes, and the sensing column electrodes can be disposed apart from each other so that they can capacitively couple with the adjacent driving column electrodes. To be noted, the column electrodes $D_1 \sim D_N$ do not need be fixed as the driving or sensing column electrodes. For example, during continuous frames, the column electrodes $D_1 \sim D_N$ can act as a sensing column electrode in turn.

Figure 2:
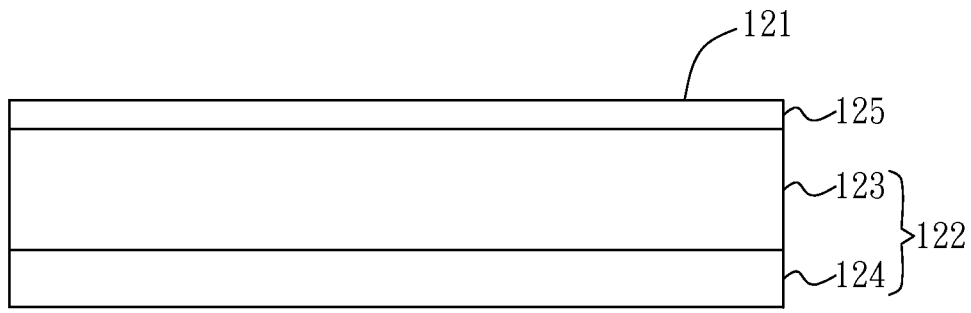
FIG. 2 is a schematic side-view diagram of the display apparatus applied to the touch sensing method according to an embodiment of the invention.

FIG. 2 is a schematic side-view diagram of the display apparatus used in the touch sensing method according to an embodiment of the invention. As shown in FIG. 2, the display apparatus includes a display surface 121 and an active matrix substrate 122 including a substrate 123 and a matrix 124. The matrix 124 is disposed on a side of the substrate 123 and the display surface 121 is disposed on the other side of the substrate 123. In comparison with the traditional known matrix substrate of an LCD display device, the active matrix substrate 122 of this embodiment is reversely disposed and that means the substrate 123 of the active matrix substrate 122 is arranged as the display surface 121 closer to the user for benefitting the coupling of the capacitive signal. In this embodiment, the display surface 121 refers to the surface of the display apparatus that closest to the user when the user views the images displayed by the display apparatus. Herein, the display apparatus can further include a protection glass 125 disposed on the side of the substrate 123 away from the matrix 124 while the display surface 121 is the surface of the protection glass 125 closer to the user. Moreover, there can be other components between the substrate 123 and the protection glass 125, such as a polarizer. Moreover, if the display apparatus in FIG. 2 is an LCD apparatus, it can further include a color filter (CF) substrate (not shown), which is placed adjacent to the side of the active matrix substrate with the matrix 124 and facing the active matrix substrate 122.

In this embodiment, the active matrix substrate 122 refers to the substrate or panel having a pixel array for displaying images, such as the thin film transistor (TFT) substrate of an LCD panel, an OLED panel, an inorganic light emitting diode panel, an electrophoretic display matrix panel or a MEMS display panel. The matrix 124 can include a plurality of column electrodes, a plurality of row electrodes and a plurality of pixel electrodes, and the column electrodes cross the row electrodes.

Figure 3:
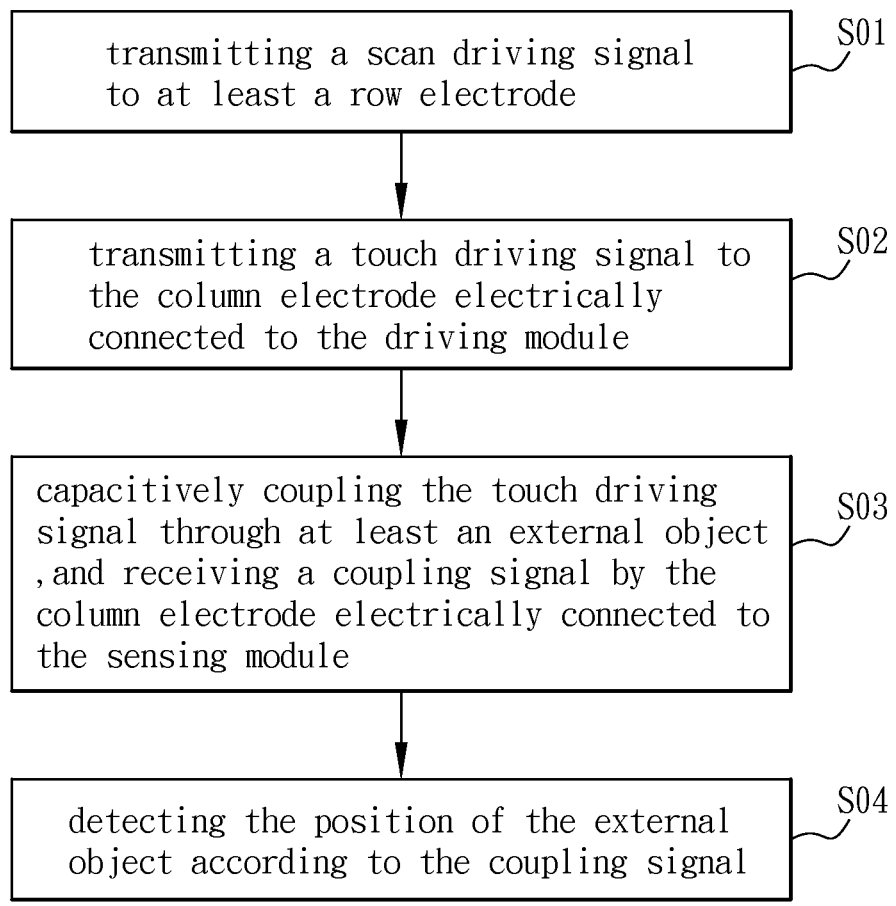
FIG. 3 is a schematic flowchart of a touch sensing method according to an embodiment of the invention.
Figure 4A:
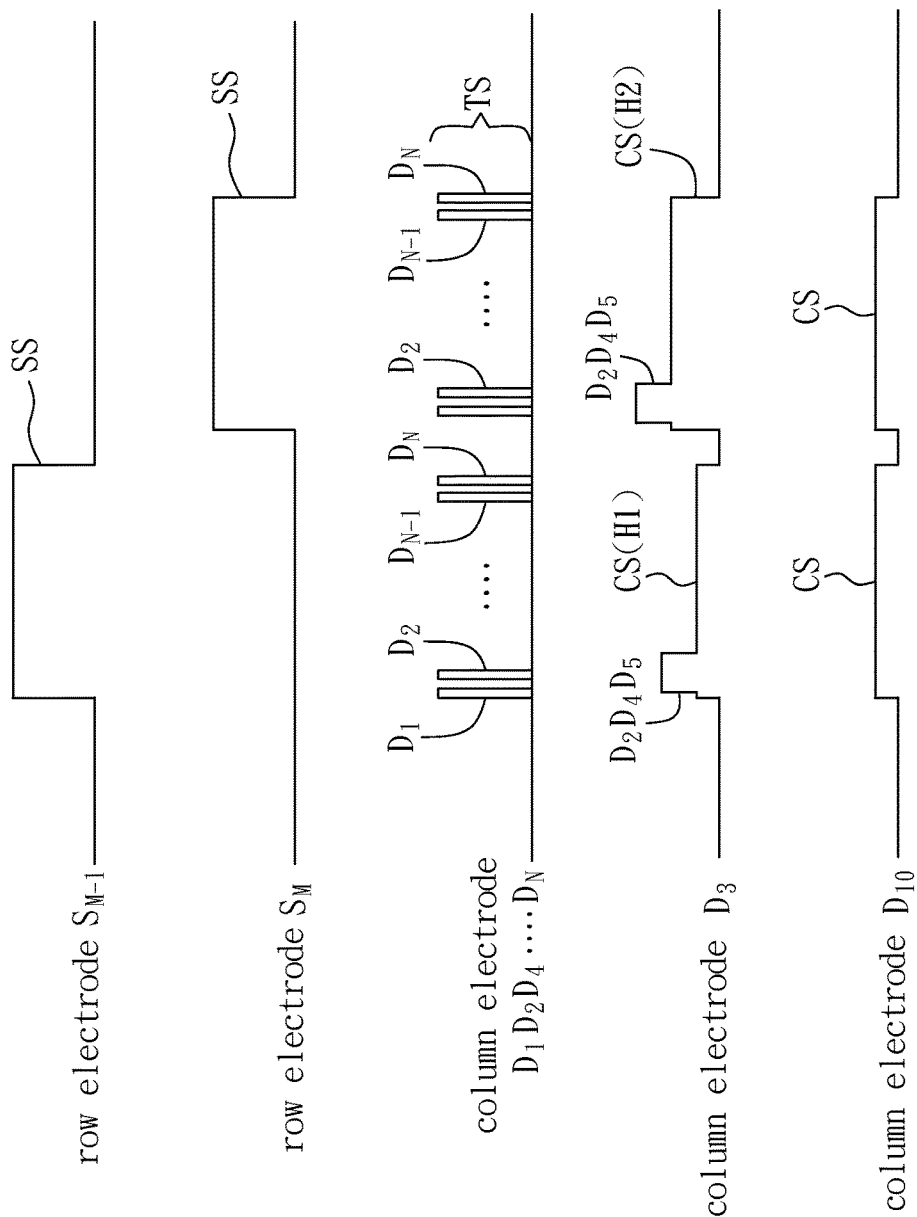
FIGS. 4(a) and 4(b) are schematic diagrams showing the signals of the touch sensing method according to embodiments of the invention.
Figure 4B:
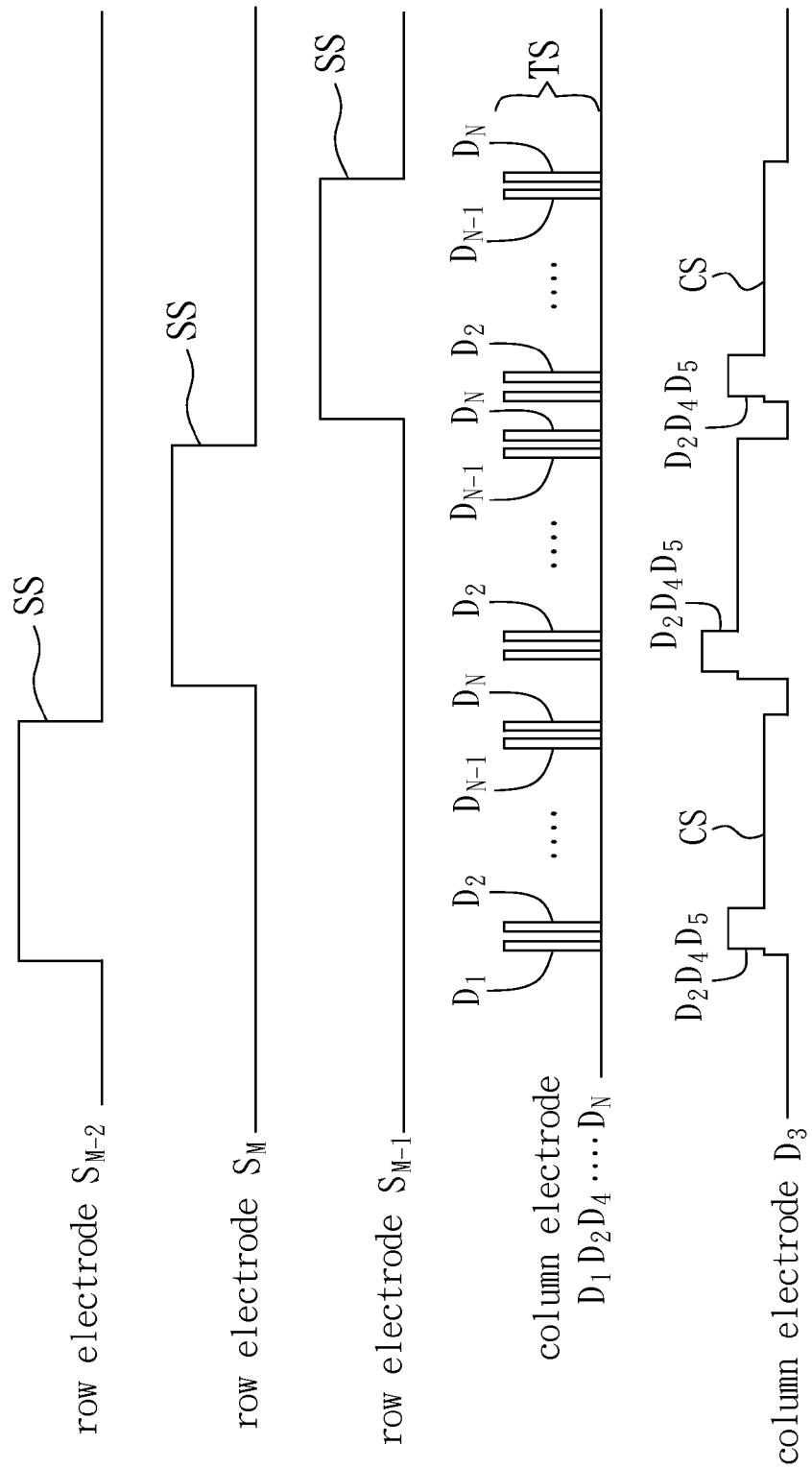

FIG. 3 is a schematic flowchart of a touch sensing method according to an embodiment of the invention, including steps S01~S04. FIGS. 4(a) and 4(b) are schematic diagrams showing the signals of the touch sensing method according to embodiments of the invention. The touch sensing method of this embodiment will be illustrated by FIGS. 1, 3, 4(a) and 4(b).

The step S01 is to transmit a scan driving signal through at least a row electrode, for example the scan driving signal SS is transmitted through the row electrode $S_1$. In this embodiment, the scan driving module (as shown in FIG. 1) transmits the scan driving signal SS through the row electrodes $S_1$~$S_M$. The scan driving module can be a driving circuit and can be electrically connected to any of the row electrodes $S_1$~$S_M$.

As shown in FIG. 1, since the switches $T_{11}$~$T_{MN}$ are electrically connected to the row electrodes $S_1$~$S_M$, the column electrodes $D_1$~$D_M$ and the pixel electrodes $E_{11}$~$E_{MN}$, the switches $T_{11}$~$T_{MN}$ corresponding to the respective row electrodes $S_1$~$S_M$ will be turned on when the respective row electrodes $S_1$~$S_M$ is transmitting the scan signals SS. Therefore, in addition to the data signal, the touch driving signal TS of the driving column electrode also will be transmitted to the corresponding pixel electrodes $E_{11}$~$E_{MN}$. Through the setup of the switches $T_{11}$~$T_{MN}$ and the pixel electrodes $E_{11}$~$E_{MN}$, the values of the touch driving signal TS and the coupling signal CS can be enhanced and also the touch sensing efficiency.

As shown in FIG. 4(a), in one of the frame of this embodiment, the column electrode $D_3$ is electrically connected to the sensing module M1 while the other column electrodes are electrically connected to the driving module M2. Therefore, the driving module M2 transmits multiple touch driving signals TS through the column electrodes $D_1$~$D_N$ except the column electrode $D_3$. The number of the sensing column electrodes can be arranged according to the required detecting speed, the size of the external object to be detected, or the size of the display apparatus. To be noted, the touch driving signals TS transmitted by the respective column electrodes $D_1$~$D_N$ can be different, but they are represented by the same waveform here for simplification. For example, in the case of finger touch, there is at least one sensing column electrode within the area touched by the finger on the operation surface.

Herein for example, an object is assumed to only touch the row electrode $S_M$ and the column electrodes $D_2$~$D_5$. The signal of the row electrode $S_M$ will be different from the signal of the row electrode $S_{M-1}$ (or others) due to the additionally coupling capacitance formed among the column electrode $S_M$, the object and the row electrode $D_3$, and the touch position can be thus determined as $S_M$. The change of the coupling capacitance is related to the object with the driving end (row electrode $S_M$) and with the sensing end (column electrode $D_3$), and also part of the pixel electrode and the capacitance between the row electrodes contribute to this coupling capacitance as well. Likewise, the coupling capacitance between the column electrode $D_3$ and the column electrodes $D_2$~$D_5$ will also be increased due to the object, and as the row electrode signal will turn on the corresponding switches $T_{M3}$, the area of each column electrode will be increased in an equivalent sense (by the pixel electrode area). Therefore, the signal level during the scanning of the row electrode $S_M$ will be increased in comparison with other row electrodes. So, the touch position information of the object can be obtained just by the signal variation of the column electrode $D_3$. For example, the coupling capacitances C1 and C2 are formed between the external object and the driving column electrode $D_2$ and the external body and the sensing column electrode $D_3$, respectively, and the touch driving signal TS on the driving column electrode $D_2$ is coupled to the object through the coupling capacitance C1, then coupled to the sensing column electrode $D_3$ through the coupling capacitance C2 and transmitted to the sensing module M1. In other embodiments, there can be different manners to obtain the coordinates of the external object, as illustrated as below. One manner is to use the touch driving signal carrying the position-encoded information and decode the received corresponding coupling signal to obtain the coordinates. Another manner is to determine the coordinates by the position of the sensing column electrode of the received coupling signal. When the sensing module M1 receives the coupling signal CS, as the coupling signal CS coupled from the touch driving signal TS carries the position-encoded information, the driving column electrode being touched can be determined by analyzing the received coupling signal CS and the one-dimensional (along the row electrode $S_M$ in the X direction) coordinate information can be thus obtained. A two-dimensional pattern of the touch range can be obtained by combining the information of different row electrodes and the touch coordinates can be thus computed. When the touch driving signal doesn't have the position-encoded information, the coupling signal CS received by the sensing module M1 represents that the corresponding column electrode is touched by the object, so one-dimensional coordinate information can be obtained from the positions of the sensing column electrodes having the coupling signal, and then a two-dimensional pattern of the touch by the object can be made up by assembling these one-dimensional coordinate information.

As illustrated in FIGS. 4(a) and 4(b), the touch driving signals TS transmitted by the column electrodes $D_1$~$D_N$ except the column electrode $D_3$ can be different from each other, but here, for the ease of illustration, they are represented by the same level. Besides, the position information is encoded by time as an example. The coupling signal CS is obtained by the coupling when the scan driving signal carried on the row electrodes changes and therefore the Y coordinate of the touch position can be determined to be on the row electrode $S_M$. FIG. 4(a) depicts an example that the column electrode $D_3$ serves as the sensing column electrode and the touched position by the external object corresponds to the row electrode $S_M$ and the column electrodes $D_2$~$D_5$. Accordingly, when the row electrodes $S_{M-1}$ and $S_M$ are enabled, the coupling signal CS from the column electrodes $D_2$~$D_5$ will be coupled to the sensing column electrode $D_3$ (corresponding to the pulses on the coupling signal CS, i.e. the higher portion of in the fore part of H1 of the signal) and the X coordinate of the touch can be computed by the time of the occurrence of the higher portion of the coupling signal CS. Besides, by comparing the signal in the rear part of H1 and H2, the coupling signal CS of H2 from the row electrode $S_M$ has higher level, so the Y coordinate can be determined thereby. Moreover, the column electrode $D_{10}$ also serves as a sensing column electrode and its signal is shown in FIG. 4(a). In this case, it can be found that the coupling signal of the column electrode $D_{10}$ only has the signal coupled from the scan driving signal and without the corresponding pulse from driving column electrodes.

FIG. 4(b) is an example where the row electrodes are not scanned sequentially. Herein, the coupling signal CS is obtained when the row electrode $S_M$ is turned on, so the Y coordinate of the touch position can be determined as on the row electrode $S_M$.

To be noted, the touch position can be obtained by judging the existence of coupling signal CS instead of the signal magnitude or variation. Therefore, the signal processing speed and the touch sensing accuracy can be considerably increased.

Also, for example, when the sensing module M1 receives multiple coupling signals CS at the same time, to identify the driving column electrodes that are transmitting the touch driving signal TS coupled to the sensing column electrode, the touch driving signals TS transmitted by different driving column electrodes need to have differences under a scan signal (i.e. the enabled duration of a certain row electrode). The said difference can be provided by, for example, frequency, amplitude, phase, time, coding or any of their combinations. As an example, the difference of the touch driving signals TS is illustrated as below by encoding the column electrodes with "0" and "1". If there are 8 column electrodes, the coding can be performed by three bits to give the column electrodes different codes for the identification. For example, (1, 0, 0) represents the column electrode $D_1$, and (1, 1, 0) represents the column electrode $D_2$. Of course, with the more column electrodes, the encoding can be performed with more bits, and for example, 10 bits can be used to identify the positions of 1024 column electrodes. Besides, it is set that, at different time, only one column electrode transmits the encoded signal, so the signal source can be determined when the signal is received.

Figure 5:
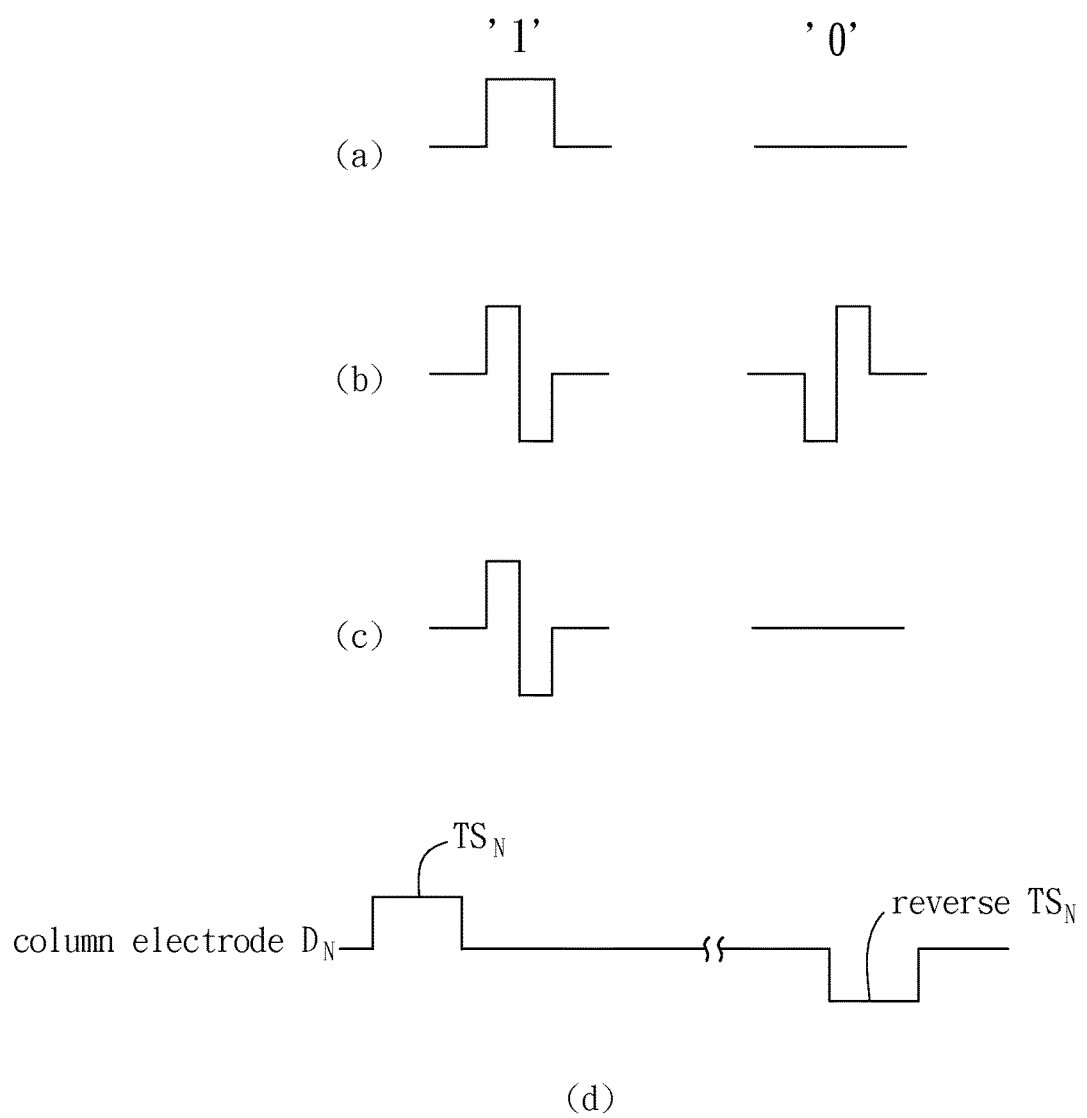
FIG. 5 is a schematic diagram of the encoded touch driving signal of the touch sensing method according to an embodiment of the invention.

FIGS. 5(a) to 5(c) are schematic driving waveforms of the encoded signals. In FIGS. 5(a) to 5(c), a pulse represents "1" and no pulse represents "0". Through the encoding of "1" and "0", the touch driving signals transmitted by different driving column electrodes can have differences, and that means the touch driving signal transmitted on the driving column electrode contains an encoded information of the position of the driving column electrode.

When the signal is applied to a display apparatus, the signal, as shown in FIG. 5(a), will result in a net DC component (the average within a unit time) and will affect the displayed image, especially, of the LCD panel. The liquid crystal will be stuck by undergoing the polarization effect when driven by a fixed positive or negative bias for a long time. So, an AC signal is used as the encoded signal or the AC driving is used in this embodiment to avoid the polarization effect of the liquid crystal, and preferably, an encoded signal with average zero is transmitted by the same column electrode. In order to avoid the influence on the display quality, the AC signal without DC component will be used to represent "0" and "1", as shown in FIGS. 5(b) and 5(c). In addition to the AC signal without DC component, the AC driving also can be performed, wherein, for example, an opposite waveform is used for the next encoded signal as shown in FIG. 5(d).

The touch driving signal TS can work with the display data signal DS of the display apparatus in the following manners. The touch driving signal and the display data signal can be transmitted in an alternate manner (occupy a period of several frame or within an image frame, for example), or the touch driving signal is transmitted during the blanking time of the display data signal, or the touch driving signal and the data display signal can be transmitted alternately within a scan time of a row electrode. The blanking time is between the consecutive frames. Herein, it is not specifically mentioned how to arrange the time of the touch sensing and the display data signal DS. The touch sensing needs to work with the touch driving signal and it can be arranged in the same ways as display data signal DS and the touch driving signal. The above embodiment also can be applied to switch the touch sensing function and the display data signal DS on a column electrode, and therefore the related description is omitted here for conciseness.

Figure 6:
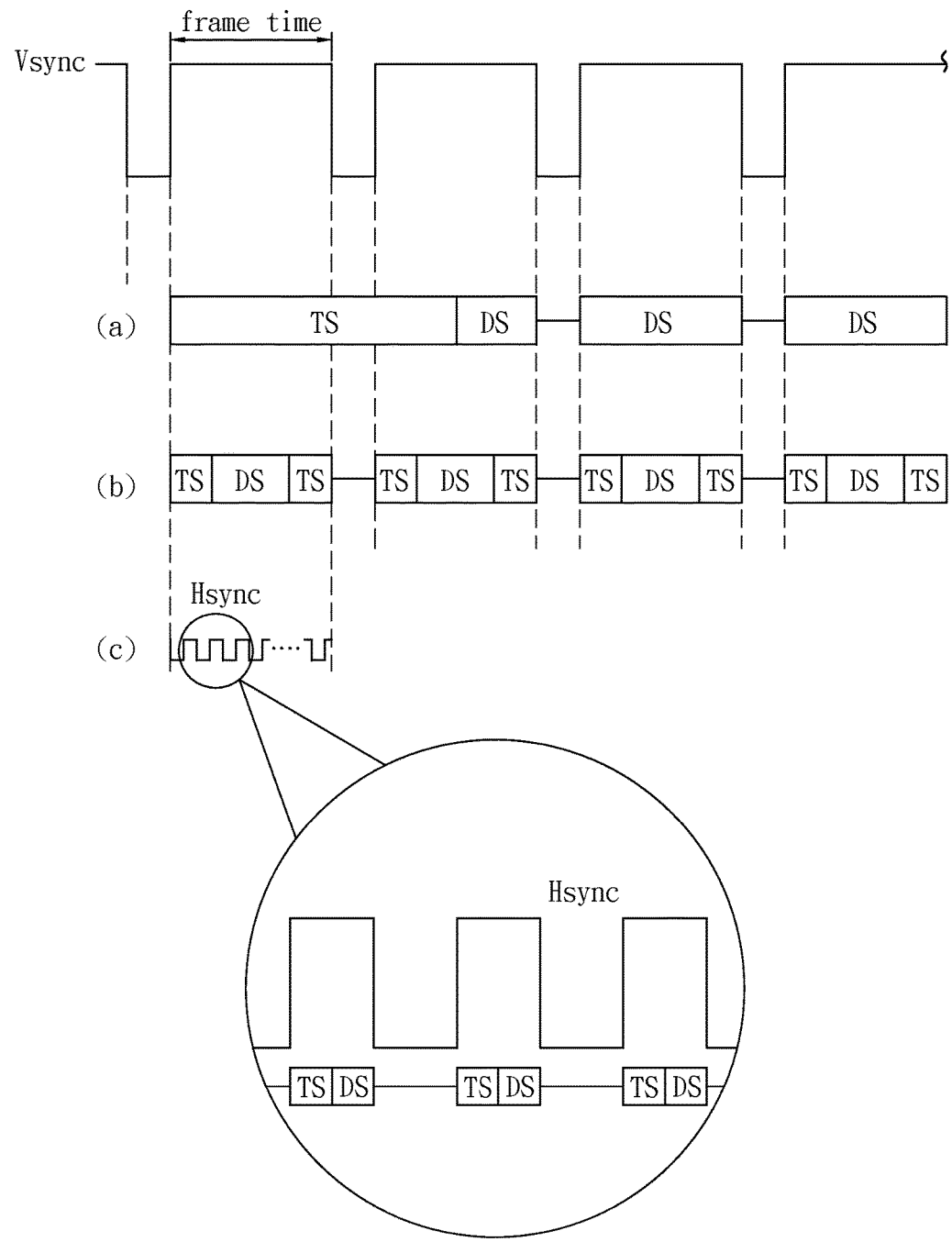
FIG. 6 is a schematic diagram to illustrate the touch driving signals interposed between the data display signals of the touch sensing method according to an embodiment of the invention.

FIGS. 6(a) to 6(c) are schematic diagrams to illustrate the touch driving signal TS is interposed between the display data signals DS. The vertical synchronization signal $V_{sync}$ represents the synchronization signal of the image frame. A cycle of the vertical synchronization signal $V_{sync}$ represents a frame time. FIG. 6(a) shows that the touch driving signal TS can be transmitted with the display data signal in an asynchronous manner and that means the touch driving signal is not inserted in every frame time but inserted in a random manner or with separation of a longer interval. When the random manner or longer interval is used for the insertion, the touch driving signal can use a whole frame time or more than a frame time without influencing the viewing quality. Herein, for example, more than 1.5 frame time is used for transmitting the touch driving signal TS. FIG. 6(b) shows that the touch driving signal TS and the display data signal DS are transmitted within the same frame time. The touch driving signal TS can be transmitted prior to or after the display data signal DS and here, as an example, the touch driving signal TS is transmitted both before and after the display data signal DS. The horizontal synchronization signal $H_{sync}$ in FIG. 6(c) represents the enabled duration of a certain row electrode within a frame. FIG. 6(c) shows that the touch driving signal TS and the display data signal DS are transmitted alternately within an enabled duration of a row electrode. For example, in order not to influence the displayed image, the touch driving signal TS is transmitted first and then the display data signal DS. In FIGS. 6(a) to 6(c), it is shown that the touch driving signal TS and the display data signal DS can be transmitted alternately. To be noted, the horizontal synchronization signal $H_{sync}$, just represents the synchronization function, and the row electrodes can be enabled sequentially (as in the conventional driving method) or non-sequentially.

Figure 7:
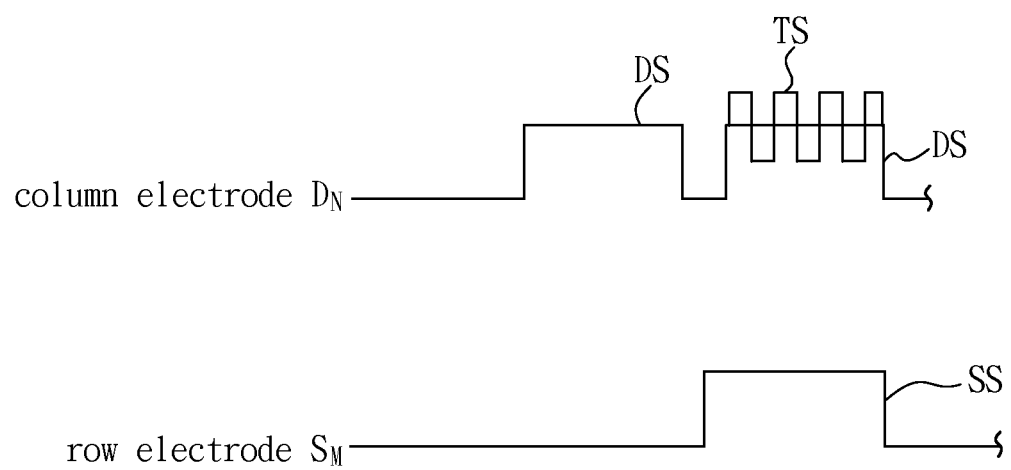
FIG. 7 is a schematic diagram showing that the touch driving signal is carried by the display signal of the touch sensing method according to an embodiment of the invention.

Since the touch sensing method of this embodiment is applied to the display apparatus, the column electrodes can transmit the plural display data signal DS and the touch driving signal TS can be carried by the display data signal DS. Hence, the touch driving signal TS and the display data signal DS are transmitted together. FIG. 7 is a schematic diagram showing that the touch driving signal TS is carried by the display signal DS. When the display signal DS is transmitted to the column electrode $D_N$, the touch driving signal TS being high-frequency signal is carried by the display signal DS. In this embodiment, a time-division multiplexing (TDM) method is used, as an example, to combine the touch driving signal TS and the display data signal DS. In other embodiments, the touch driving signal TS can be introduced into the display data signal DS by other techniques, such as frequency-division multiplexing (FDM), code-division multiplexing (CDM) or phase shift keying.

In order to avoid the difference in the images caused by using fixed column electrode as the driving column electrode (for transmitting touch driving signal) or sensing column electrode (for receiving coupling signal), different combination of the column electrodes can be implemented by the switches SW in FIG. 1. Different combination of column electrodes as the driving column electrode and the sensing column electrode can be achieved by the switches SW to even out the difference in image quality caused by the touch driving signal and the coupling signal. For example, the column electrodes can be divided into different districts. For example 1024 column electrodes can be divided into 64 districts and each district has 15 driving column electrodes and 1 sensing column electrode. The said sensing column electrode can be any column electrode in the district, and, for example, is located at the center to sense the nearby driving column electrodes. To be noted, when multiple sensing column electrodes receive the coupling signals, the touch sensing method further includes a step of determining the position of the external object by using the average position of those column electrodes receiving the coupling signals. For example, if 5 column electrodes all receive the coupling signals, the third column electrode, the center of the 5 column electrodes, is regarded as the position of the external object. Moreover, the time difference method also can be used, wherein all the column electrodes are electrically connected to the sensing module sequentially, so that the every column electrode serves as the sensing column electrode sequentially.

Figure 8A:
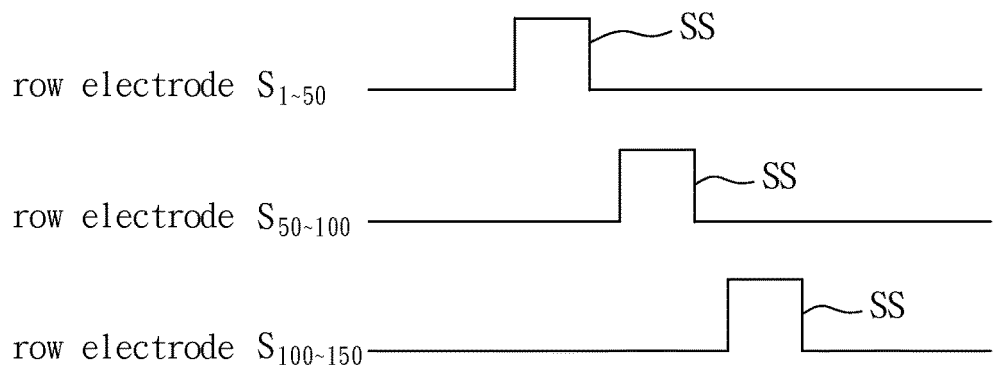
FIGS. 8A and 8B are schematic diagrams of the signals of different multi-electrode driving methods of the touch sensing method according to an embodiment of the invention.

In the above-mentioned touch sensing method, it can implement a driving method of multi-electrode scanning, wherein multiple row electrodes are enabled at the same time for switching between high/low sensing resolutions. That is to say, a low resolution scan is first executed (for example, only apply the scan signal to a part of the row electrodes or the touch sensing area is divided into several regions for the partial scanning, such as the odd number region is scanned first) to detect whether the touching occurs or not, and then, after a coupling signal is detected, switch to the line-by-line scanning to determine the correct touch coordinates. Since the low resolution scan method can finish the whole surface touch sensing rapidly without detailed signal judgment and calculation, the response speed can be considerably enhanced. FIG. 8A is a schematic diagram of a multi-electrode progressive scanning. For example, in FIG. 8A, per 50 row electrodes forms a group for a non-overlapping low resolution scanning. That is, the row electrodes $S_1$~$S_{50}$, $S_{51}$~$S_{100}$, $S_{101}$~$S_{150}$, . . . , form a group respectively for multi-electrode scanning and judge whether the operation surface is touched or not within the frame time accordingly.

For column electrodes in the occasion of high resolution sensing, the touch driving signal can be chosen according to the interval of the sensing column electrodes. For example, when the interval of the sensing column electrodes is far less than the object or the density of the sensing column electrodes is high, the region of a touch activity can be determined by those sensing column electrodes that receive the coupling signal. Therefore, all the touch driving signals within the scan time can be the same. On the other hand, when the interval between touch sensing column electrodes is too large for obtaining an accurate position solely based on the position of the sensing column electrode, the touch driving signal can be configured with the position information and applied to the column electrode so that the signal source can be recognized from the signal received by the sensing column electrode.

Figure 8B:
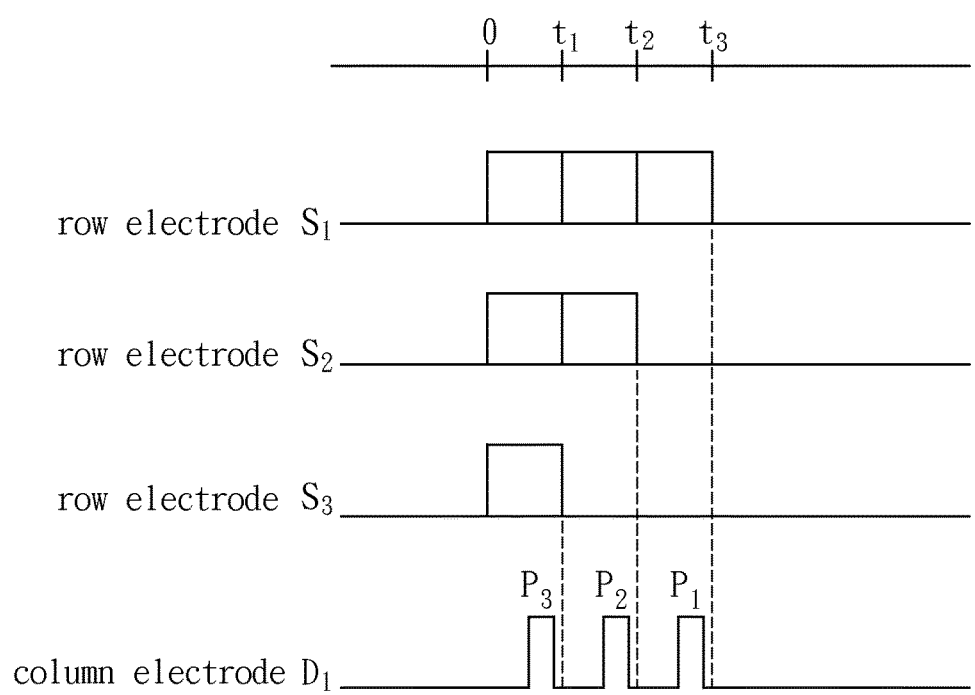

As shown in FIG. 8B, the multi-electrode scanning of the row electrodes also can be implemented in a time-overlapping manner. For example, in the time t1, the row electrodes $S_1$~$S_3$ are all scanned; in the time t1~t2, only the row electrodes $S_2$, $S_3$ are scanned; and in the time t2~t3, only the row electrode $S_3$ is scanned.

In FIG. 8B, in order to keep the correct pixel of the display image, the row electrodes which are turned on (enabled) at the same time need to be turned off one by one, and before turning off, the column electrodes need to transmit the display signal corresponding to the respective pixel, P3, P2, P1. The turn-on combination and turn-off order of the row electrodes can be set differently in different frame times to even the influence on the image quality caused by different turn-on time. To achieve the above requirement, the display apparatus further includes a memory module, which stores the data of the pixels of the image so that the data of the displayed image can be temporarily stored in the memory module. Subsequently, a particular algorithm is used to determine the length of the enabled duration and the turn-off order of the row electrodes of the said frame, and then the required display signals transmitted by the column electrodes can thus be obtained. Further by combining with the touch signal, the driving signals of the column and row electrodes in the frame can be obtained. For example, as shown in FIG. 8B, for the column electrode D1, the turn-off sequence of the row electrode will be $S_3$, $S_2$, $S_1$ in order to match the scan signals of the row electrodes $S_3$, $S_2$, $S_1$. Accordingly, the column electrode $D_1$ needs to reversely transmit the data display signals $P_3$, $P_2$, $P_1$ so as to correspond to the pixel electrodes $E_{31}$, $E_{21}$, $E_{11}$, respectively.

In summary, the display apparatus and the touch sensing method of the invention make use of, the row electrodes to transmit the scan driving signal, the column electrodes that are in the driving mode to transmit the touch driving signal, and the column electrodes that are in the sensing mode to couple the coupling signal and transmit to the sensing module. Hence, the touch coordinates can be obtained according to the coupling signal. Thus, the display apparatus and the touch sensing method thereof of the invention can be directly applied to the active matrix substrate having column electrodes and row electrodes, such as a display panel including scan lines and data lines, so that the product can be slim and lighter, reduce the product cost and enhance the product competitiveness. Furthermore, in the display apparatus and the touch sensing method thereof of the invention, the touch position is obtained by the existence of the coupling signal or the code instead of detecting the electrode capacitance change, so the accuracy of the touch sensing can be considerably enhanced.

The invention at least has two differences from the general touch method. First, the touch position is obtained not by detecting the touch signals along two axial directions, but the detection is just implemented along a single axial direction and, for the other axial direction, a scan signal changing the sensing area will decide the detecting region. These one dimensional results are assembled into a two-dimensional sensing data for deducing the information, such as touch position. Second, the invention does not detect the variation of the capacitance caused by the human body (or other objects capable of causing capacitive coupling) touching the surface, but the human body is used to couple the signal of the driving column electrode to the sensing column electrode, so the human body plays a role of signal transmission instead of grounding role.

Although the invention has been described with reference to specific embodiments, this description is not meant to be construed in a limiting sense. Various modifications of the disclosed embodiments, as well as alternative embodiments, not apart from the essence of this invention should fall within the scope of the appended claims.

What is claimed is:

1. A touch sensing method of a display apparatus including an active matrix substrate including a plurality of pixel electrodes, a plurality of column electrodes for transmitting display data signals and for driving and sensing touch signals during a period to perform touch detection, and a plurality of row electrodes crossing the column electrodes for transmitting display scan signals, wherein each of the column electrodes acts as a driving column electrode and a sensing column electrode respectively through a switch switching between an electrical connection to a driving module and a sensing module, the touch sensing method comprising steps of:

connecting at least one of the column electrodes as the driving column electrode to the driving module and simultaneously connecting at least another column electrode as the sensing column electrode to the sensing module;

during one row electrode scanning period:
transmitting a scan driving signal for touch detection through at least one of the plurality of row electrodes;
transmitting a touch driving signal through the driving column electrode;
transmitting the touch driving signal from the driving column electrode through at least an external object to the sensing column electrode by coupling so as to form a coupling signal on the sensing column electrode;
during transmitting the touch driving signal through the driving column electrode, at the same time the sensing module sensing the coupling signal which is caused by the touch driving signal coupled from the driving column electrode through the external object and formed on the sensing column electrode;
obtaining one-dimensional coordinate results for the external object along the row electrodes according to the sensed coupling signal sensed by the sensing module during each row electrode scanning period, and
combining the one-dimensional coordinate results for the external object along the row electrodes obtained from each row electrode scanning period to form two-dimensional coordinates of the external object.

2. The touch sensing method as recited in claim 1, wherein the row electrodes sequentially transmit the scan driving signal.

3. The touch sensing method as recited in claim 1, wherein at least a part of the row electrodes transmits the scan driving signal at the same time.

4. The touch sensing method as recited in claim 1, wherein the touch driving signal transmitted on the at least a driving column electrode contains information that is encoded with the position of the at least a driving column electrode.

5. The touch sensing method as recited in claim 1, further comprising:
switching at least one of the column electrodes to connect electrically to the driving module or the sensing module to act as a driving column electrode or a sensing column electrode.

6. The touch sensing method as recited in claim 5, wherein at least one of the column electrodes is the driving column electrode at a first time when such column electrode is electrically connected to the driving module and is the sensing column electrode at a second time when such column electrode is electrically connected to the sensing module.

7. The touch sensing method as recited in claim 1, wherein the active matrix substrate further includes a plurality of switches and a plurality of pixel electrodes, the switches are electrically connected to the column electrodes, the row electrodes and the pixel electrodes, when the row electrodes transmit the scan driving signal, the switches corresponding to the row electrodes are turned on and the touch driving signal of the column electrodes are transmitted to the corresponding pixel electrodes.

8. The touch sensing method as recited in claim 1, further comprising:
detecting the position of the external object according to the average position of the column electrodes receiving the coupling signals.

9. The touch sensing method as recited in claim 1, further comprising:
transmitting a touch driving signal with a display data signal signals through at least a driving column electrode.

10. The touch sensing method as recited in claim 9, wherein the touch driving signal and the display data signal are transmitted in an alternate manner.

11. The touch sensing method as recited in claim 9, wherein the touch driving signal is transmitted during the transmitting blanking time of the display data signal.

12. The touch sensing method as recited in claim 9, wherein the touch driving signal is carried in the display data signal.

13. The touch sensing method as recited in claim 1, wherein the waveform of the touch driving signal is an AC signal.

14. A display apparatus having a touch sensing function, comprising:
an active matrix substrate including a plurality of pixel electrodes, a plurality of column electrodes for transmitting display data signals and for driving and sensing touch signals during a period to perform touch detection, and a plurality of row electrodes crossing the column electrodes for transmitting display scan signals, wherein each of the column electrodes acts as a driving column electrode and a sensing column electrode respectively through a switch switching between an electrical connection to a driving module and a sensing module,
wherein said at least one of the column electrodes as the driving column electrode is connected to the driving module, and simultaneously said another column electrode as the sensing column electrode is connected to the sensing module,
wherein during one row electrode scanning period:
at least one of the plurality of row electrodes transmits a scan driving signal for touch detection,
the driving module transmits a touch driving signal through the driving column electrode, wherein during transmitting the touch driving signal through the driving column electrode, at least an external object couples the touch driving signal from the driving column electrode to the sensing column electrode so as to form a coupling signal on the sensing column electrode, and at the same time, from the sensing column electrode, the sensing module senses the coupling signal which is caused by the touch driving signal coupled from the driving column electrode through the external object and formed on the sensing column electrode;, wherein one-dimensional coordinate results for the external object along the row electrodes are obtained according to the coupling signal sensed by the sensing module during each row electrode scanning period, and, according to the one-dimensional coordinate results from each row electrode scanning period, two-dimensional coordinates of the external object are formed by combining the one-dimensional coordinate results for the external object along the row electrodes.

15. The display apparatus as recited in claim 14, wherein the active matrix substrate is a thin film transistor (TFT) substrate, each of the row electrodes is a scan line and each of the column electrodes is a data line.

16. The display apparatus as recited in claim 14, wherein the active matrix substrate further includes a plurality of switches and a plurality of pixel electrodes, the switches are electrically connected to the column electrodes, the row electrodes and the pixel electrodes.

17. The display apparatus as recited in claim 14, further comprising:
a memory module storing pixel data of the images.

18. The display apparatus as recited in claim 14, wherein the active matrix substrate includes a substrate and a matrix, the matrix is disposed on a side of the substrate and a display surface of the display apparatus is disposed on the other side of the substrate.

* * * * *